United States Patent

Takahashi et al.

[11] Patent Number: 5,188,993
[45] Date of Patent: Feb. 23, 1993

[54] MICROWAVE DIELECTRIC CERAMIC COMPOSITION

[75] Inventors: Hisakazu Takahashi; Yoko Baba; Kenichi Ezaki; Yasuhiko Okamoto; Kenichi Shibata, all of Osaka; Kazuhiko Kuroki, Kyoto; Shigeyuki Yasuyama, Osaka, all of Japan

[73] Assignee: Sanyo Electric Co., Ltd., Osaka, Japan

[21] Appl. No.: 823,458

[22] Filed: Jan. 22, 1992

[30] Foreign Application Priority Data

| Jan. 23, 1991 | [JP] | Japan | 3-6457 |
| Feb. 28, 1991 | [JP] | Japan | 3-34106 |
| Apr. 26, 1991 | [JP] | Japan | 3-97486 |
| May 9, 1991 | [JP] | Japan | 3-104458 |
| May 16, 1991 | [JP] | Japan | 3-111913 |
| Aug. 29, 1991 | [JP] | Japan | 3-218872 |
| Nov. 19, 1991 | [JP] | Japan | 3-303293 |
| Dec. 6, 1991 | [JP] | Japan | 3-323237 |

[51] Int. Cl.$^5$ ............ C04B 35/46; C04B 35/48; C04B 35/49; H01B 1/00
[52] U.S. Cl. .............. 501/136; 501/134; 501/135; 252/62.9; 252/518; 252/520; 252/521; 423/592; 423/593; 423/598; 423/641
[58] Field of Search ............ 501/134, 135, 136, 139, 501/137; 252/518, 519, 520, 521, 62.9; 423/592, 593, 598, 641

[56] References Cited

U.S. PATENT DOCUMENTS

| 4,610,969 | 8/1986 | Wada et al. | 501/137 |
| 4,610,971 | 8/1986 | Wada et al. | 501/137 |
| 4,753,906 | 6/1988 | Nishigaki et al. | 501/139 |
| 4,960,551 | 10/1990 | Eonomoto et al. | 264/65 |
| 5,077,247 | 12/1991 | Sato et al. | 501/137 |

FOREIGN PATENT DOCUMENTS 0084099 7/1976 Japan ............ 501/137

Primary Examiner—Mark L. Bell
Assistant Examiner—Michael Marcheschi
Attorney, Agent, or Firm—Armstrong, Westerman, Hattori, McLeland & Naughton

[57] ABSTRACT

A microwave dielectric ceramic composition which is obtained by selecting, in a composition formula of $(A^{1+}_{\frac{1}{2}} \cdot B^{3+}_{\frac{1}{2}}) TiO_3$, $Li^{1+}$ and $Nd^{3+}$, $Co^{3+}$ or $Pr^{3+}$ as $A^{1+}$ and $B^{3+}$, respectively. The dielectric ceramic composition expressed by $(A^{1+}_{\frac{1}{2}} \cdot B^{3+}_{\frac{1}{2}}) TiO_3$ has a high dielectric constant and has a temperature coefficient of resonance frequency $\tau f$ which is large on the minus side. MgO, CoO, ZnO, $CaCO_3$ or $SrCO_3$ is added to such a dielectric ceramic composition expressed by $(A^{1+}_{\frac{1}{2}} \cdot B^{3+}_{\frac{1}{2}}) TiO_3$, to improve the Q value of the dielectric ceramic composition.

15 Claims, 3 Drawing Sheets

MICROWAVE DIELECTRIC CERAMIC COMPOSITION

BACKGROUND OF THE INVENTION

1. Field of the Invention

The present invention relates to dielectric ceramic compositions for use as resonators employed in a microwave frequency band of several gigahertz.

2. Description of the Prior Art

In recent years, attempts have been made to use a dielectric material for a resonator or a filter used in satellite communication, broadcasting and microwave remote communication using a microwave a frequency band of several gigahertz. A transmitter-receiver such as a microwave remote recognition system is also sought.

Examples of this type of dielectric ceramic material conventionally used include a composition of a $BaO\text{-}TiO_2\text{-}Nd_2O_3\text{-}Bi_2O_3$ system which is proposed in, for example, Japanese Patent Laid-Open Gazette No. 8806/1986. In this conventional dielectric ceramic composition, its dielectric constant $\epsilon$ is as high as 70 to 90. In addition, the temperature coefficient of resonance frequency $\tau f$ of the dielectric ceramic composition is also high, i.e., $+10$ to about $+20$ PPM/°C., so that sufficient properties cannot be obtained.

Meanwhile, when a dielectric resonator is constructed, the higher the dielectric constant $\epsilon$ of a material used, the smaller the size the resonator can be. Accordingly, a material having a higher dielectric constant $\epsilon$ is desired.

Examples of a material having a high dielectric constant $\epsilon$ include $SrTiO_3$ and $CaTiO_3$. However, these cannot be used because the dielectric constant $\epsilon$ is very high, i.e., 300 and 180, while their temperature coefficient of resonance frequency $\tau f$ is very high, i.e., $+1700$ PPM/°C. and $+800$ PPM/°C.

Examples of a method of reducing the temperature coefficient of resonance frequency $\tau f$ of such a dielectric ceramic composition include a method of combining a material having a dielectric constant $\epsilon$ which is as high as possible and a temperature coefficient of resonance frequency $\tau f$ which takes a minus value with the dielectric ceramic composition. According to this method, a ceramic composition having a high dielectric constant $\epsilon$ and having a low temperature coefficient of resonance frequency $\tau f$ is obtained by a suitable combination.

In general, however, as the dielectric constant $\epsilon$ becomes higher, the temperature coefficient of resonance frequency $\tau f$ becomes larger on the plus side. A material having a high dielectric constant $\epsilon$ and a temperature coefficient of resonance frequency $\tau f$ which is large on the minus side has not been known.

SUMMARY OF THE INVENTION

The present invention has been made in view of the above described points and has for its object to obtain a dielectric ceramic composition having a high dielectric constant $\epsilon$ and having a temperature coefficient of resonance frequency $\tau f$ which is large on the minus side.

Another object of the present invention is to improve the Q value of such a dielectric ceramic composition.

Still another object of the present invention is to provide a dielectric ceramic composition having a high dielectric constant $\epsilon$ and having a temperature coefficient of resonance frequency $\tau f$ which is close to zero.

When a microwave dielectric ceramic composition according to the present invention is expressed by a composition formula of $(A^{1+}{}_{\frac{1}{2}} \cdot B^{3+}{}_{\frac{1}{2}}) TiO_3$, $Li^{1+}$ and $Nd^{3+}$, $Sm^{3+}$, $Co^{3+}$ or $Pr^{3+}$ are respectively selected as $A^{1+}$ and $B^{3+}$.

Furthermore, the present invention provides a dielectric ceramic composition obtained by suitably selecting $MgO$, $CoO$, $ZnO$, $CaCO_3$ or $SrCO_3$ and adding the same to the ceramic composition expressed by $(A^{1+}{}_{\frac{1}{2}} \cdot B^{3+}{}_{\frac{1}{2}}) TiO_3$.

The above described dielectric ceramic composition expressed by $(A^{1+}{}_{\frac{1}{2}} \cdot B^{3+}{}_{\frac{1}{2}}) TiO_3$ has a high dielectric constant $\epsilon$ and has a temperature coefficient of resonance frequency $\tau f$ which is large on the minus side. $MgO$, $CoO$, $ZnO$, $CaCO_3$ or $SrCO_3$ is added to such a dielectric ceramic composition $(Li_{\frac{1}{2}} \cdot B^{3+}{}_{\frac{1}{2}}) TiO_3$, thereby to improve the Q value of the dielectric ceramic composition.

Additionally, when the microwave dielectric ceramic composition according to the present invention is expressed by a composition formula of $w \cdot A^{1+}{}_2 O - x \cdot A^{1+'}{}_2 O - y \cdot B^{3+}{}_2 O_3 - z \cdot TiO_2$ (where $w+x+y+z=100$ mole %), $Li^{1+}$, $Na^{1+}$, and $Nd^{3+}$ or $Sm^{3+}$ are respectively selected as $A^{1+}$, $A^{1+'}$, and $B^{3+}$.

As described in the foregoing, a dielectric ceramic composition mainly composed of $Li_2O\text{-}Na_2O\text{-}Sm_2O_3\text{-}TiO_2$ and a dielectric ceramic composition mainly composed of $Li_2O\text{-}Na_{Na2}O\text{-}Nd_2O_3\text{-}TiO_2$ have a high dielectric constant $\epsilon$ and have a low temperature coefficient of resonance frequency $\tau f$.

Furthermore, when the microwave dielectric ceramic composition according to the present invention is expressed by a composition formula of $v \cdot B^{3+'}{}_2 O_3 - w \cdot A^{1+}{}_2 O - x \cdot A^{1+'}{}_2 O - y \cdot B^{3+}{}_2 O_3 - z \cdot TiO_2$ (where $v+w+x+y+z=100$ mole %), $Li^{1+}$, $Na^{1+}$, $Sm^{3+}$, and $Nd^{3+}$ or $Pr^{3+}$ are respectively selected as $A^{1+}$, $A^{1+'}$, $B^{3+}$, and $B^{3+'}$.

As described in the foregoing, a dielectric ceramic composition mainly composed of $Nd_2O_3\text{-}Li_2O\text{-}Na_2O\text{-}Sm_2O_3\text{-}TiO_2$ and a dielectric ceramic composition mainly composed of $Pr_2O_3\text{-}Li_2O\text{-}Na_2O\text{-}Sm_2O_3\text{-}TiO_2$ have a high dielectric constant $\epsilon$ and have a low temperature coefficient of resonance frequency $\tau f$.

Furthermore, when the microwave dielectric ceramic composition according to the present invention is expressed by a composition formula of $w \cdot A^{1+}{}_2 O - x \cdot CaO - y \cdot B^{3+}{}_2 O_3 - z \cdot TiOhd 2$ (where $w+x+y+z=100$ mole %), $Li^{1+}$ and $Sm^{3+}$ or $Nd^{3+}$ are respectively selected as $A^{1+}$ and $B^{3+}$. Thus, a dielectric ceramic composition mainly composed of $Li_2O\text{-}CaO\text{-}Sm_2O_3\text{-}TiO_2$ and a dielectric ceramic composition mainly composed of $Li_2O\text{-}CaO\text{-}Nd_2O_3\text{-}TiO_2$ have a high dielectric constant $\epsilon$ and have a low temperature coefficient of resonance frequency $\tau f$.

Additionally, when the microwave dielectric ceramic composition according to the present invention is expressed by a composition formula of $x \cdot (Li_{\frac{1}{2}} \cdot B^{3+}{}_{\frac{1}{2}}) TiO_3 - (100-x) \cdot CaTiO_3$ (Where 0 mole % $<x<$ 100 mole %), $Nd^{3+}$ or $Sm^{3+}$ is selected as $B^{3+}$.

Furthermore, when the microwave dielectric ceramic composition according to the present invention is expressed by a composition formula of $x \cdot (Li_{\frac{1}{2}} \cdot B^{3+}{}_{\frac{1}{2}}) TiO_3 - 100-x) \cdot (Na_{\frac{1}{2}} \cdot C^{3+}{}_{\frac{1}{2}}) TiO_3$ (where 0 mole % $<x<$ 100 mole %), $Nd^{3+}$ or $Sm^{3+}$ and $Nd^{3+}$ or $Sm^{3+}$ are respectively selected as $B^{3+}$ and $C^{3+}$.

Moreover, the above described dielectric ceramic composition $(Li_{\frac{1}{2}} \cdot B^{3+}_{\frac{1}{2}}) TiO_3$ and a dielectric ceramic composition $(Na_{\frac{1}{2}} \cdot C^{3+}_{\frac{1}{2}}) TiO_3$ or $CaTiO_3$ are combined with each other, thereby to obtain a dielectric ceramic material having a high dielectric constant $\epsilon$ and having a low temperature coefficient of resonance frequency $\tau f$.

The foregoing and other objects, features, aspects and advantages of the present invention will become more apparent from the following detailed description of the present invention.

DESCRIPTION OF THE PREFERRED EMBODIMENTS

Figure 1:
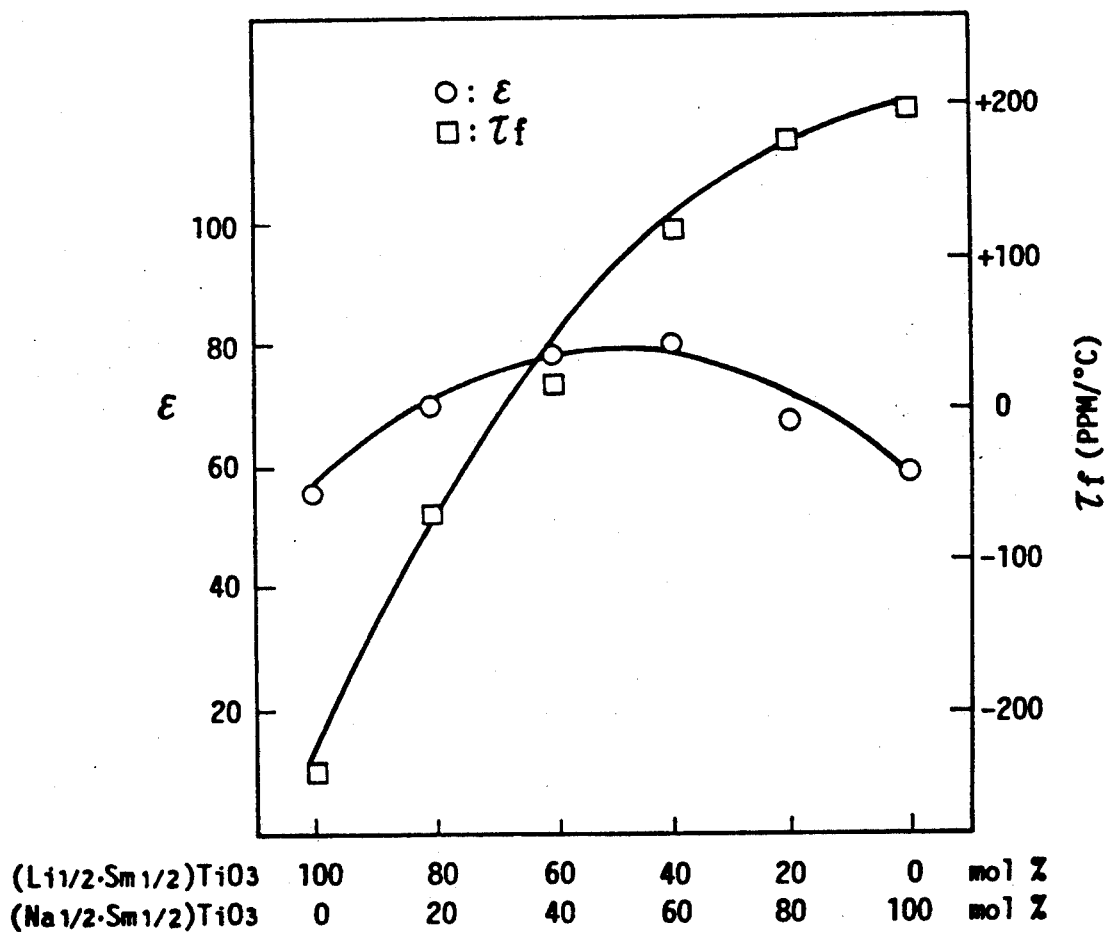
FIG. 1 is a characteristic diagram showing a characteristic curve of a dielectric constant $\epsilon$ and a temperature coefficient of resonance frequency $\tau f$ against the mixture ratio of $(Li_{\frac{1}{2}} \cdot Sm_{\frac{1}{2}}) TiO_3$ to $(Na_{\frac{1}{2}} \cdot Sm_{\frac{1}{2}}) TiO_3$ according to the present invention.

Description is now made of a first embodiment of the present invention.

A microwave ceramic composition according to the first embodiment is obtained by selecting, in a composition formula of $(A^{1+}_{\frac{1}{2}} \cdot B^{3+}_{\frac{1}{2}}) TiO_3$, $Li^{1+}$ and $Nd^{3+}$, $Sm^{3+}$, $Co^{3+}$ or $Pr^{3+}$ as $A^{1+}$ and $B^{3+}$, respectively.

First, a method of fabricating the microwave ceramic composition will be described.

As raw materials, high-purity powders of $TiO_2$, $Li_2CO_3$, $Nd_2O_3$, $Sm_2O_3$, $Co_2O_3$, $Pr_6O_{11}$ were weighed so as to be predetermined molar fractions. For example, used as $TiO_2$ is one of a high-purity grade which is manufactured by Toho Titanium Co., Ltd.; used as $Li_2CO_3$ is one of a 3N grade which is manufactured by Kojundo Kagaku Co., Ltd.; used as $Nd_2O_3$ is one of a 3N grade which is manufactured by Mitui Mining and Smelting Co., Ltd.; used as $Co_2O_3$ is one of a reagent grade which is manufactured by Kojundo Kagaku Co., Ltd.; and used as $Pr_6O_{11}$ is one of a 3N grade which is manufactured by Mitui Mining and Smelting Co., Ltd.

Description is made of a specific example of the fabrication of the microwave dielectric ceramic composition according to the present embodiment using the above described raw materials.

First, as molar fractions of the high-purity powders of $TiO_2$, $Li_2CO_3$, $Nd_2O_3$, $Sm_2O_3$, $Co_2O_3$, and $Pr_6O_{11}$, $TiO_2$ shall be 1 mole, $Li_2CO_3$ shall be $\frac{1}{4}$ mole, $Nd_2O_3$ shall be $\frac{1}{4}$ mole when $Nd_2O_3$ is selected in addition thereto, $Sm_2O_3$ shall be $\frac{1}{4}$ mole when $Sm_2O_3$ is selected in addition thereto, $Co_2O_3$ shall be $\frac{1}{4}$ mole when $Co_2O_3$ is selected in addition thereto, and $Pr_6O_{11}$ shall be 1/12 mole when $Pr_6O_{11}$ is selected in addition thereto.

The raw material powders, a nylon ball of $15\phi$ and ethyl alcohol were put in a nylon pot, mixed in the following condition, and wet-blended for eight hours.

Raw material powders:Nylon ball:Ethyl alcohol = 100 g:500 g:500 cc

The blended powder was then dried at 120° C. for 24 hours. The dried powder was crushed in a mortar made of alumina. The crushed powder was packed in a boat made of magnesia (MgO) and calcined at 900° to 1200° C., and particularly, at 1150° C. in the present embodiment for two hours. The calcined powder is crushed again in the mortar.

This crushed powder was put in the nylon pot under the following condition and wet-ground for 20 to 60 hours, and particularly, for 30 hours, in the present embodiment.

Crushed powder:Nylon ball:Ethyl alcohol = 100 g:1000 g:500 cc

Subsequently, this ground powder was dried at 120° C. for 24 hours. The dried ground powder was crushed, and a 10 solution of polyvinyl alcohol is mixed as a binder so as to account for three per cent of 50 g of the powder using the mortar to granulate the powder. The granulated powder was dried at 100° C. for five hours.

Thereafter, the dried powder was classified using two types of screens, that is, a 100-mesh screen (150 μm) and a 200-mesh screen (75 μm), to take out only grains having a diameter of 75 to 150 μm.

The classified powder was pressed into a disc having a diameter of 10 mm and a thickness of 6 mm at a pressure of 2000 to 3000 Kg/cm$^2$, and particularly, 2550 Kg/cm$^2$, in the present embodiment.

Subsequently, the pressed forming powder was put in a boat for sintering made of alumina with a plate made of zirconia ($ZrO_2$) being laid on the bottom thereof, and was held and sintered for two hours at 350° C., for two hours at 600° C. and for five hours at 1300° C. at a heating rate of 150° C./H. Both surfaces of the sintered object ware polished using abrasive powder OF-800# manufactured by, for example, Fujimi Abrasive Co., Ltd. such that the thickness of the sintered object is one-half of the diameter thereof. In addition, both surfaces of the polished object were polished clean again using wet abrasive paper 1500#. Thereafter, the polished object was ultrasonic cleaned by acetone and finally, dried at 100° C. for two hours to prepare a sample.

The dielectric constant $\epsilon$ and the Q value of the sample thus prepared were measured using a network analyzer (YHP 8510B) in the neighborhood of the measurement frequency of 3 GHz using the dielectric resonator method (Hakki-Coleman method). In addition, the temperature coefficient of resonance frequency $\tau f$ was calculated from the following equation by putting a measuring system in a constant temperature bath to measure the change in resonance frequency at 0° to 70° C.:

$$f = \frac{F_{70} - F_{20}}{F_{20} \times \Delta T} \times 10^6 (PPM/°C.)$$

where $F_{70}$ denotes a resonance frequency at 70° C., $F_{20}$ denotes a resonance frequency at 20° C., and $\Delta T$ denotes a temperature difference.

The results of measurements made by varying $A^{1+}$ and $B^{3+}$ are shown in Table 1.

TABLE 1

| sample number | composition $A^{+1}$ | $B^{3+}$ | dielectric constant $\epsilon$ | Q value | $\tau f$ (PPM/°C.) | note |
|---|---|---|---|---|---|---|
| 1 | $Li^{1+}$ | $Nd^{3+}$ | 80 | 430 | −310 | |
| 2 | $Li^{1+}$ | $Sm^{3+}$ | 52 | 470 | −260 | |

TABLE 1-continued

| sample number | composition $A^{+1}$ | $B^{3+}$ | dielectric constant $\epsilon$ | Q value | $\tau f$ (PPM/°C.) | note |
|---|---|---|---|---|---|---|
| 3 | $Li^{1+}$ | $Co^{3+}$ | 31 | 2200 | −58 | |
| 4 | $Li^{1+}$ | $Pr^{3+}$ | 92 | 340 | −405 | |
| 5* | $Li^{1+}$ | $Cr^{3+}$ | — | — | — | impossible to measure |
| 6* | $Li^{1+}$ | $La^{3+}$ | — | — | — | impossible to measure |
| 7* | $K^{1+}$ | $Nd^{3+}$ | — | — | — | impossible to measure |

In the table 1, asterisked samples 5 to 7 are comparative examples beyond the scope of the present invention. In a combination in the comparative example, the sample is sintered. However, the sample is inferior in dielectric properties in the microwave region, thereby making it impossible to measure the sample.

On the other hand, as can be seen from the table 1, a ceramic composition having a high dielectric constant $\epsilon$ and having a temperature coefficient of resonance frequency $\tau f$ which is large on the minus side is obtained by selecting, in a composition formula of $(A^{1+}_{\frac{1}{2}} B^{3+}_{\frac{1}{2}}) TiO_3$, $TiO_3$, $Li^{1+}$ and $Nd^{3+}$, $Sm^{3+}$, $Co^{3+}$ or $Pr^{3+}$ as $A^{1+}$ and $B^{3+}$, respectively.

Description is now made of a second embodiment. A ceramic composition according to the second embodiment is obtained by adding to the ceramic composition $(Li_{\frac{1}{2}} \cdot B^{3+}_{\frac{1}{2}}) TiO_3$ obtained in the above described first embodiment MgO, CoO or ZnO when $B^{3+}$ is $Nd^{3+}$ or $Pr^{3+}$ or $CaCO_3$, $SrCO_3$ or ZnO when $B^{3+}$ is $Sm^{3+}$. A predetermined part by weight of $CaCO_3$, $SrCO_3$ or ZnO is added to 100 parts by weight of main components of $(Li_{\frac{1}{2}} \cdot B^{3+}_{\frac{1}{2}}) TiO_3$. As this additive, used as $CaCO_3$ is one of a reagent grade which is manufactured by Kishida Chemical Co., Ltd., used as $SrCO_3$ is one of a reagent grade which is manufactured by Kishida Chemical Co., Ltd., or used as ZnO is one of a 3N grade which is manufactured by Kojundo Kagaku Co., Ltd.

In the second embodiment, a predetermined amount of the above described additive is mixed with powder obtained by wet-blending respective raw materials of the main components of $(Li_{\frac{1}{2}} \cdot B^{3+}_{\frac{1}{2}}) TiO_3$, followed by dryblending. Thereafter, a sample is completed by calcination, forming and sintering in the same method as that in the first embodiment.

The results of measurements made of the dielectric properties of samples to be measured which are prepared by varying the amount of addition of each of the above described additives in the neighborhood of the measurement frequency of 3 GHz using the Hakki-Coleman method are shown in Table 2, Table 3 and Table 4.

Table 2 shows the results of measurements made when MgO, CoO or ZnO is added to $(Li_{\frac{1}{2}} \cdot Nd^{3+}_{\frac{1}{2}}) TiO_3$.

Table 3 shows the results of measurements made when $CaCO_3$, $SrCO_3$ or ZnO is added to $(Li_{\frac{1}{2}} \cdot Sm^{3+}_{\frac{1}{2}}) TiO_3$.

Table 4 shows the results of measurements made when MgO, CoO or ZnO is added to $(Li_{\frac{1}{2}} \cdot Pr^{3+}_{\frac{1}{2}}) TiO_3$.

TABLE 2

| sample number | additive (part by weight) | dielectric constant $\epsilon$ | Q value | $\tau f$ (PPM/°C.) |
|---|---|---|---|---|
| | MgO | | | |
| 8 | 0 | 80 | 430 | −310 |
| 9 | 1 | 71 | 900 | −207 |
| 10 | 3 | 56 | 1873 | −149 |
| 11 | 5 | 48 | 1939 | −150 |
| 12 | 10 | 40 | 2023 | −194 |
| | CoO | | | |
| 13 | 0 | 80 | 430 | −310 |
| 14 | 1 | 71 | 844 | −262 |
| 15 | 3 | 64 | 1318 | −173 |
| 16 | 5 | 57 | 1936 | −145 |
| 17 | 10 | 44 | 3181 | −82 |
| | ZnO | | | |
| 18 | 0 | 80 | 430 | −310 |
| 19 | 1 | 71 | 841 | −275 |
| 20 | 3 | 66 | 1183 | −169 |
| 21 | 5 | 55 | 2203 | −126 |
| 22 | 10 | 42 | 2841 | −27 |

TABLE 3

| sample number | additive (part by weight) | dielectric constant $\epsilon$ | Q value | $\tau f$ (PPM/°C.) |
|---|---|---|---|---|
| | $CaCO_3$ | | | |
| 23 | 0 | 52 | 470 | −260 |
| 24 | 1 | 56 | 676 | −322 |
| 25 | 3 | 62 | 1301 | −154 |
| 26 | 10 | 49 | 1073 | −275 |
| 27* | 15 | 58 | 1680 | −38 |
| | $SrCO_3$ | | | |
| 28 | 0 | 52 | 470 | −260 |
| 29 | 3 | 60 | 833 | −272 |
| 30 | 5 | 63 | 909 | −267 |
| 31 | 10 | 55 | 916 | −232 |
| 32* | 15 | 65 | 386 | −45 |
| | ZnO | | | |
| 33 | 0 | 52 | 470 | −260 |
| 34 | 1 | 59 | 752 | −230 |
| 35 | 3 | 48 | 1003 | −192 |
| 36 | 5 | 43 | 767 | −110 |
| 37* | 15 | 35 | 1196 | 57 |

TABLE 4

| sample number | additive (part by weight) | dielectric constant $\epsilon$ | Q value | $\tau f$ (PPM/°C.) |
|---|---|---|---|---|
| | MgO | | | |
| 38 | 0 | 92 | 340 | −405 |
| 39 | 1 | 71 | 632 | −307 |
| 40 | 3 | 61 | 806 | −210 |
| 41 | 10 | 43 | 941 | −173 |
| 42* | 20 | 27 | 1057 | −67 |
| | CoO | | | |
| 32 | 0 | 92 | 340 | −405 |
| 44 | 3 | 67 | 714 | −258 |
| 45 | 5 | 75 | 555 | −336 |
| 46 | 10 | 46 | 1518 | −96 |
| 47* | 20 | 32 | 4111 | +32 |
| | ZnO | | | |
| 48 | 0 | 92 | 340 | −405 |
| 49 | 1 | 76 | 539 | −360 |
| 50 | 3 | 67 | 732 | −276 |
| 51 | 5 | 57 | 1097 | −100 |
| 52* | 20 | 32 | 6355 | 20 |

In the tables, asterisked samples 27, 32, 37, 42, 47 and 52 are comparative examples beyond the scope of the present invention.

As can be seen from the tables 2 to 4, the Q value is improved by the addition of each of the additives. However, as the amount of the addition is increased, the Q value becomes larger, while the dielectric constant become lower. Consequently, the amount of the addition of each of the additives is suitably not more than 10 parts by weight per 100 parts by weight of $(Li_{\frac{1}{4}} \cdot B^{3+}{}_{\frac{1}{4}})TiO_3$.

Description is now made of a third embodiment.

A microwave ceramic composition according to the third embodiment is obtained by selecting, in a composition formula of $(A^{1+} \cdot A^{1+'})_2O \cdot B^{3+}{}_2O_3 \cdot TiO_2$, $Li^{1+}$, $Na^{1+}$, and $Nd^{3+}$ as $A^{1+}$, $A^{1+'}$, and $B^{3+}$, respectively. In the third embodiment, to prepare samples high-purity powders of $TiO_2$, $Li_2CO_3$, $Na_2CO_3$, and $Nd_2O_3$ are used as raw materials, and the mixture ratio of the respective raw materials is changed in the same method as that in the first embodiment. The dielectric properties of the samples measured in the neighborhood of the measurement frequency of 3 GHz using the Hakki-Coleman method are shown in Table 5. In the table, w, x, y and z indicate molar fractions, where $w+x+y+z=100$ mole %.

TABLE 5

| sample number | composition ratio (mole %) w.Li₂O—x.Na₂O—y.Nd₂O₃—z.TiO₂ | | | | dielectric properties | | |
|---|---|---|---|---|---|---|---|
| | w | x | y | z | ε | Q value | τ f(PPM/°C.) |
| 53 | 1.00 | 8.33 | 18.13 | 72.54 | 76 | 805 | +70 |
| 54 | 1.50 | 8.33 | 18.03 | 72.14 | 97 | 715 | +57 |
| 55 | 2.00 | 8.33 | 17.93 | 71.74 | 96 | 665 | +52 |
| 56 | 2.50 | 8.33 | 17.83 | 71.34 | 103 | 710 | +41 |
| 57 | 3.00 | 8.33 | 17.73 | 70.94 | 104 | 720 | +35 |
| 58 | 4.00 | 8.33 | 17.53 | 70.14 | 106 | 654 | +21 |
| 59 | 4.36 | 4.55 | 18.22 | 72.87 | 98 | 810 | −15 |
| 60 | 5.00 | 8.33 | 17.33 | 69.34 | 109 | 569 | −2 |
| 61 | 5.82 | 4.55 | 17.93 | 71.70 | 101 | 740 | −55 |
| 62 | 7.00 | 8.33 | 16.93 | 67.74 | 101 | 470 | −80 |
| 63* | 7.27 | 4.55 | 17.64 | 70.54 | 96 | 665 | −83 |
| 64 | 9.00 | 8.33 | 16.93 | 67.74 | 101 | 470 | −80 |
| 65 | 10.18 | 4.55 | 17.05 | 68.22 | 91 | 555 | −255 |
| 66 | 13.09 | 4.55 | 16.47 | 65.89 | 93 | 325 | −165 |

As can be seen from table 5, a dielectric ceramic composition expressed by a composition formula of $w \cdot Li_2O - x \cdot Na_2O - y \cdot Nd_2O_3 - z \cdot TiO_2$ ($w+x+y+z=100$ mole %) has a high dielectric constant ε, has a low temperature coefficient of resonance frequency τf and has a high Q value.

| 0.0 mole % < w ≤ 17.0 mole % |
|---|
| 0.0 mole % ≤ x ≤ 17.0 mole % |
| 0.0 mole % < y ≤ 25.0 mole % |
| 0.0 mole % < z ≤ 80.0 mole % |

Particularly when w, x, y and z are set in the following ranges, good dielectric properties are obtained:

| 3.0 mole % ≤ w ≤ 15.0 mole % |
|---|
| 3.0 mole % ≤ x ≤ 15.0 mole % |
| 9.0 mole % ≤ y ≤ 25.0 mole % |
| 0.0 mole % ≤ z ≤ 80.0 mole % |

Description is now made of a fifth embodiment.

A microwave ceramic composition according to the fifth embodiment is obtained by selecting, in a composition formula of $(A^{1+} \cdot A^{1+'})_2O - B^{3+}{}_2O_3 - TiO_2$, $Li^{1+}$, $Na^{1+}$, and $Sm^{3+}$ as $A^{1+}$, $A^{1+'}$, and $B^{3+}$, respectively. In the fourth embodiment, high-purity powders of $TiO_2$, $Li_2CO_3$, $Na_2CO_3$, and $Sm_2O_3$ are used as raw materials, and the mixture ratio of the respective raw materials is changed in the same method as that in the first embodiment, to prepare samples. The dielectric properties of the samples measured in the neighborhood of the measurement frequency of 3 GHz using the Hakki-Coleman method are shown in Table 6. In the table, w, x, y and z indicate molar fractions, where $w+x+y+z=100$ mole %.

TABLE 6

| sample number | composition ratio (mole %) | | | | dielectric properties | | |
|---|---|---|---|---|---|---|---|
| | w | x | y | z | ε | Q value | τ f(PPM/°C.) |
| | w.Li₂O—x.Na₂O—y.Nd₂O₃—z.TiO₂ | | | | | | |
| *67 | 0.00 | 16.67 | 16.67 | 66.66 | 73 | 2390 | +213 |
| 68 | 3.00 | 6.68 | 18.67 | 71.66 | 80 | 1200 | +51 |
| 69 | 3.60 | 6.68 | 17.96 | 71.76 | 80 | 1990 | +41 |
| 70 | 3.75 | 6.68 | 17.17 | 72.41 | 83 | 2210 | +44 |
| 71 | 4.50 | 6.68 | 18.67 | 70.16 | 80 | 2670 | 0 |
| 72 | 4.50 | 6.68 | 17.17 | 71.77 | 84 | 2100 | +35 |
| 73 | 4.80 | 6.68 | 17.72 | 70.80 | 82 | 1870 | +21 |
| 74 | 5.52 | 15.00 | 17.00 | 62.48 | 82 | 1790 | +137 |
| 75 | 5.85 | 10.00 | 18.00 | 66.15 | 68 | 1610 | +45 |
| 76 | 6.00 | 6.68 | 18.67 | 68.66 | 80 | 2530 | −29 |
| 77 | 6.00 | 6.68 | 16.42 | 70.91 | 86 | 1590 | +7 |
| 78 | 6.00 | 6.68 | 17.48 | 69.84 | 83 | 1975 | +5 |
| 79 | 6.18 | 5.00 | 17.81 | 71.01 | 79 | 2750 | −46 |
| 80 | 6.40 | 3.34 | 18.06 | 72.20 | 72 | 1180 | −62 |
| 81 | 6.75 | 6.68 | 16.42 | 70.16 | 89 | 1180 | −8 |
| 82 | 6.75 | 6.68 | 17.92 | 68.66 | 82 | 2140 | −40 |
| 83 | 6.80 | 15.00 | 17.00 | 61.20 | 79 | 2270 | +129 |
| 84 | 7.20 | 6.68 | 17.24 | 68.88 | 87 | 1430 | −28 |
| 85 | 7.20 | 10.00 | 18.00 | 61.80 | 79 | 2140 | +30 |

TABLE 6-continued

| sample number | composition ratio (mole %) | | | | dielectric properties | | |
|---|---|---|---|---|---|---|---|
| | w | x | y | z | $\epsilon$ | Q value | $\tau$ f(PPM/°C.) |
| | w.Li$_2$O—x.Na$_2$O—y.Nd$_2$O$_3$—z.TiO$_2$ | | | | | | |
| 86 | 7.76 | 3.00 | 19.40 | 69.84 | 71 | 1070 | −119 |
| 87 | 8.00 | 3.34 | 16.33 | 72.33 | 74 | 2040 | +8 |
| 88 | 8.00 | 3.34 | 17.74 | 70.92 | 72 | 2220 | −91 |
| 89 | 8.00 | 3.34 | 19.33 | 69.33 | 71 | 2740 | −122 |
| 90 | 8.10 | 10.00 | 17.10 | 64.80 | 85 | 1930 | +44 |
| 91 | 8.75 | 3.00 | 18.74 | 69.74 | 72 | 2730 | −132 |
| 92 | 9.00 | 3.34 | 18.33 | 69.33 | 70 | 2500 | +138 |
| 93 | 10.80 | 6.68 | 16.52 | 66.00 | 102 | 1170 | +55 |
| 94 | 12.00 | 6.68 | 16.28 | 65.04 | 82 | 1550 | −20 |
| 95 | 14.40 | 3.34 | 16.46 | 65.80 | 68 | 1310 | −184 |

In the table, an esterified sample 67 is a comparative example beyond the scope of the present invention.

As can be seen from the table 6, a dielectric ceramic composition expressed by a composition formula of w·Li$_2$O−x·Na$_2$O−y·Sm$_2$O$_3$−z·TiO$_2$ (w+x+y+z=100 mole %) has a high dielectric constant $\epsilon$, has a low temperature coefficient of resonance frequency $\tau$f and has a high Q value. In the sample 67 lacking Li$_2$O, the absolute value of the temperature coefficient of resonance frequency $\tau$f is slightly high.

w, x, y and z are set in the following ranges:

| |
|---|
| 0.0 mole % < w ≦ 17.0 mole % |
| 0.0 mole % ≦ x ≦ 17.0 mole % |
| 0.0 mole % < y ≦ 25.0 mole % |
| 0.0 mole % < z ≦ 80.0 mole % |

Particularly when w, x, y and z are set in the following ranges, good dielectric properties are obtained:

| |
|---|
| 0.0 mole % < w ≦ 15.0 mole % |
| 0.0 mole % ≦ x ≦ 15.0 mole % |
| 0.0 mole % < y ≦ 20.0 mole % |
| 0.0 mole % < z ≦ 75.0 mole % |

Description is now made of a fifth embodiment.

A microwave ceramic composition according to the fifth embodiment is obtained by selecting, in a composition formula of (A$^{1+}$·A$^{1+\prime}$)$_2$O−(B$^{3+}$·B$^{3+\prime}$)$_2$O$_3$−TiO$_2$, Li$^{1+}$, Na$^{1+}$, Sm$^{3+}$, and Nd$^{3+}$ as A$^{1+}$, A$^{1+\prime}$, B$^{3+}$, and B$^{3+\prime}$, respectively. In the fifth embodiment, high-purity powders of TiO$_2$, Li$_2$CO$_3$, Na$_2$CO$_3$, Nd$_2$O$_3$, and Sm$_2$O$_3$ are used as raw materials, and the mixture ratio of the respective raw materials is changed in the same method as that in the first embodiment, to prepare samples. The dielectric properties of the samples measured in the neighborhood of the measurement frequency of 3 GHz using the Hakki-Coleman method are shown in Table 7. In the table 7, v, w, x, y and z denote molar fractions, where v+w+x+y+z=100 mole %.

TABLE 7

| sample number | composition ratio (mole %) | | | | | dielectric properties | | |
|---|---|---|---|---|---|---|---|---|
| | v.Nd$_2$O$_3$—w.Li$_2$O—x.Na$_2$O—y.Sm$_2$O$_3$—z.TiO$_2$ | | | | | | | |
| | v | w | x | y | z | $\epsilon$ | Q value | $\tau$ f(PPM/°C.) |
| 97 | 3.33 | 4.80 | 3.33 | 15.04 | 73.50 | 83 | 750 | +24 |
| 98 | 3.33 | 5.20 | 3.33 | 15.60 | 72.54 | 81 | 1250 | +3 |
| 99 | 3.33 | 6.40 | 3.33 | 14.72 | 72.22 | 79 | 2250 | −71 |
| 100 | 3.33 | 8.00 | 3.33 | 14.40 | 70.94 | 77 | 2200 | −99 |
| 101 | 3.33 | 11.20 | 3.33 | 13.76 | 68.38 | 67 | 790 | −212 |
| 102 | 3.33 | 14.40 | 3.33 | 13.12 | 65.82 | 75 | 640 | −186 |
| 103 | 6.66 | 3.90 | 6.66 | 11.7 | 71.08 | 89 | 1850 | −1 |
| 104 | 6.66 | 3.60 | 6.66 | 11.28 | 71.80 | 92 | 1480 | +22 |
| 105 | 6.66 | 4.80 | 6.66 | 11.04 | 70.84 | 78 | 2370 | −69 |
| 106 | 6.66 | 6.00 | 6.66 | 10.80 | 69.88 | 94 | 1410 | −10 |
| 107 | 6.66 | 8.40 | 6.66 | 10.32 | 67.96 | 98 | 860 | −10 |
| 108 | 6.66 | 10.80 | 6.66 | 9.84 | 66.04 | 113 | 570 | +77 |

As can be seen from the table 7, a dielectric ceramic composition expressed by a composition formula of v·Nd$_2$O$_3$−w·Li$_2$O−x·Na$_2$O−y·Sm$_2$O$_3$−x·TiO$_2$ (v+w+x+y+z=100 mole %) has a high dielectric constant $\epsilon$, has a low temperature coefficient of resonance frequency $\tau$f and has a high Q value.

v, w, x, y and z are set in the following ranges:

| |
|---|
| 0.0 mole % < v ≦ 25.0 mole % |
| 0.0 mole % ≦ w ≦ 17.0 mole % |
| 0.0 mole % < x ≦ 17.0 mole % |
| 0.0 mole % < y ≦ 25.0 mole % |
| 0.0 mole % < z ≦ 80.0 mole % |

Particular when v, w, x, y and z are set in the following ranges, good dielectric properties are obtained:

| |
|---|
| 3.0 mole % ≦ v ≦ 7.0 mole % |
| 3.0 mole % ≦ w ≦ 15.0 mole % |
| 0.0 mole % ≦ x ≦ 7.0 mole % |
| 0.0 mole % < y ≦ 16.0 mole % |
| 0.0 mole % < z ≦ 75.0 mole % |

Description is now made of a sixth embodiment.

A microwave ceramic composition according to the sixth embodiment is obtained by selecting, in a composition formula of (A$^{1+}$·A$^{1+\prime}$)$_2$O−(B$^{3+}$·B$^{3+\prime}$)$_2$O$_3$−TiO$_2$, Li$^{1+}$, Na$^{1+}$, Sm$^{3+}$, and Pr$^{3+}$ as A$^{1+}$, A$^{1+\prime}$, B$^{3+}$, and B$^{3+\prime}$, respectively. In the sixth embodiment, high-purity powders of TiO$_2$, Li$_2$CO$_3$, Na$_2$CO$_3$, Nd$_2$O$_3$, and Pr$_6$O$_{11}$ are used as raw materials, and the mixture ratio of the respective raw materials is changed in the same method as that in the first embodiment, to prepare samples. The dielectric properties of the samples measured in the neighborhood of the measurement frequency of 3 GHz using the Hakki-Coleman method are shown in Table 8. In the table, v, w, x, y and z indicate molar fractions, where v+w+x+y+z=100 mole %.

seventh embodiment, high-purity powders of $TiO_2$, $Li_2CO_3$, $CaCO_3$, and $Sm_2O_3$ are used as raw materials, and the mixture ratio of the respective raw materials is changed in the same method as that in the first embodi-

TABLE 8

| sample number | composition ratio (mole %) $v \cdot Pr_2P_3 - w \cdot Li_2O - x \cdot Na_2O - y \cdot Sm_2O_3 - z \cdot TiO_2$ | | | | | dielectric properties | | |
|---|---|---|---|---|---|---|---|---|
| | v | w | x | y | z | $\epsilon$ | Q value | $\tau$ f(PPM/°C.) |
| 109 | 3.33 | 4.80 | 3.33 | 15.04 | 73.50 | 84 | 830 | +26 |
| 110 | 3.33 | 6.40 | 3.33 | 14.72 | 72.22 | 81 | 2050 | -50 |
| 111 | 3.33 | 8.00 | 3.33 | 14.40 | 70.94 | 78 | 2000 | -97 |
| 112 | 3.33 | 11.20 | 3.33 | 13.76 | 68.38 | 69 | 720 | -217 |
| 113 | 3.33 | 14.40 | 3.33 | 13.12 | 65.82 | 76 | 670 | -195 |
| 114 | 6.66 | 3.60 | 6.66 | 11.28 | 71.80 | 95 | 1170 | +34 |
| 115 | 6.66 | 4.80 | 6.66 | 11.04 | 70.84 | 95 | 1120 | +15 |
| 116 | 6.66 | 6.00 | 6.66 | 10.80 | 69.88 | 99 | 1080 | +16 |
| 117 | 6.66 | 8.40 | 6.66 | 10.32 | 67.96 | 106 | 560 | +20 |
| 118 | 6.66 | 10.80 | 6.66 | 9.84 | 66.04 | 115 | 390 | +93 |

As can be seen from the table 8, a dielectric ceramic composition expressed by a composition formula of $v \cdot Pr_2O_3 - w \cdot Li_2O - x \cdot Na_2O - y \cdot Sm_2O_3 - z \cdot TiO_2$ (v+w+x+y+z=100 mole %) has a high dielectric constant $\epsilon$, has a low temperature coefficient of resonance frequency $\tau$f and has a high Q value.

ment, to prepare samples. The dielectric properties of the samples measured in the neighborhood of the measurement frequency of 3 GHz using the Hakki-Coleman method are shown in Table 9. In the table, w, x, y and z denote molar fractions, where v+w+x+y+z=100 mole %.

TABLE 9

| sample number | composition ratio (mole %) $w \cdot Li_2O - x \cdot CaO - y \cdot Sm_2O_3 - z \cdot TiO_2$ | | | | dielectric properties | | |
|---|---|---|---|---|---|---|---|
| | w | x | y | z | $\epsilon$ | Q value | $\tau$ f(PPM/°C.) |
| 119 | 3.50 | 20.00 | 11.28 | 65.12 | 90 | 1840 | +164 |
| 120 | 4.80 | 10.00 | 15.40 | 70.16 | 87 | 1590 | +21 |
| 121 | 4.80 | 20.00 | 11.04 | 64.16 | 104 | 1720 | +155 |
| 122 | 5.00 | 10.00 | 10.00 | 75.00 | 89 | 1390 | +55 |
| 123 | 6.00 | 20.00 | 10.80 | 63.20 | 111 | 1630 | +156 |
| 124 | 6.40 | 10.00 | 14.72 | 68.88 | 92 | 1910 | +8 |
| 125 | 8.00 | 10.00 | 14.40 | 67.60 | 95 | 1780 | -8 |
| 126 | 8.40 | 20.00 | 10.32 | 61.28 | 121 | 1510 | +179 |
| 127 | 11.20 | 10.00 | 13.76 | 65.04 | 106 | 1550 | +8 |
| 128 | 20.00 | 10.00 | 10.00 | 75.00 | 75 | 1700 | -44 |
| 129 | 7.00 | 17.00 | 13.00 | 63.00 | 98 | 1980 | -15 |
| 130 | 8.00 | 17.00 | 12.00 | 63.00 | 104 | 1500 | +7 |
| 131 | 9.00 | 16.00 | 12.00 | 63.00 | 105 | 1550 | -2 |
| 132 | 9.00 | 17.00 | 11.00 | 63.00 | 108 | 1190 | +45 |
| 133 | 12.50 | 12.50 | 12.50 | 62.50 | 103 | 1277 | +6 |
| 134 | 8.82 | 23.53 | 8.82 | 58.83 | 123 | 1156 | +154 |
| 135 | 5.56 | 33.33 | 5.56 | 55.55 | 133 | 1025 | +457 |
| 136 | 2.63 | 42.11 | 2.63 | 52.63 | 108 | 1190 | +835 | v, w, x, y and z are set in the following ranges:

| |
|---|
| 0.0 mole % < v ≦ 7.0 mole % |
| 0.0 mole % < w ≦ 15.0 mole % |
| 0.0 mole % ≦ x ≦ 7.0 mole % |
| 0.0 mole % < y ≦ 16.0 mole % |
| 0.0 mole % < z ≦ 75.0 mole % |

Particularly when v, w, x, y and z are set in the following ranges, good dielectric properties are obtained:

| |
|---|
| 3.0 mole % ≦ v ≦ 7.0 mole % |
| 3.0 mole % ≦ w ≦ 15.0 mole % |
| 3.0 mole % ≦ x ≦ 7.0 mole % |
| 9.0 mole % ≦ y ≦ 16.0 mole % |
| 65.0 mole % ≦ z ≦ 75.0 mole % |

Description is now made of a seventh embodiment.

A microwave ceramic composition according to the seventh embodiment is obtained by selecting, in a composition formula of $A^{1+}_2O - CaO - B^{3+}_2O_3 - TiO_2$, $Li^{1+}$ and $Sm^{3+}$ as $A^{1+}$ and $B^{3+}$, respectively. In the As can be seen from the table 9, a dielectric ceramic composition expressed by a composition formula of $w \cdot Li_2O - x \cdot CaO - y \cdot Sm_2O_3 - z \cdot TiO_2$ (w+x+y+z=100 mole %) has a high dielectric constant $\epsilon$, has a low temperature coefficient of resonance frequency $\tau$f and has a high Q value.

Particularly when v, w, x and y and z are set in the following ranges, good dielectric properties are obtained:

| |
|---|
| 0.0 mole % < w ≦ 25.0 mole % |
| 0.0 mole % ≦ x < 50.0 mole % |
| 0.0 mole % < y ≦ 20.0 mole % |
| 0.0 mole % < z ≦ 80.0 mole % |

Description is now made of an eighth embodiment.

A microwave ceramic composition according to the eighth embodiment is obtained by selecting, in a composition formula of $A^{1+}_2O - CaO - B^{3+}_2O_3 - TiO_2$, $Li^{1+}$ and $Nd^{3+}$ as $A^{1+}$ and $B^{3+}$, respectively. In the eighth embodiment, high-purity powders of $TiO_2$, $Li_2CO_3$, $CaCO_3$, and $Nd_2O_3$ are used as raw materials, and the mixture ratio of the respective raw materials is changed in the same method as that in the first embodiment, to prepare samples. The dielectric properties of the samples measured in the neighborhood of the measurement frequency of 3 GHz using the Hakki-Coleman method are shown in Table 10. In the table, w, x, y and z indicate molar fractions, where $v+w+x+y+z=100$ mole %.

TABLE 10

| sample number | composition ratio (mole %) $w \cdot Li_2O - x \cdot CaO - y \cdot Nd_2O_3 - z \cdot TiO_2$ | | | | dielectric properties | | |
|---|---|---|---|---|---|---|---|
| | w | x | y | z | $\epsilon$ | Q value | $\tau f$(PPM/°C.) |
| 137 | 14.52 | 6.45 | 14.52 | 64.52 | 104 | 810 | −129 |
| 138 | 4.00 | 16.66 | 12.53 | 66.80 | 109 | 672 | +8 |
| 139 | 5.00 | 16.66 | 12.27 | 65.73 | 114 | 790 | +5 |
| 140 | 6.70 | 16.66 | 12.00 | 64.67 | 118 | 802 | +3 |
| 141 | 9.30 | 16.66 | 11.47 | 62.53 | 118 | 820 | +12 |
| 142 | 12.00 | 16.66 | 10.93 | 60.40 | 124 | 662 | +18 |
| 143 | 18.00 | 16.66 | 8.74 | 56.60 | 141 | 405 | +25 |
| 144 | 8.50 | 30.50 | 5.50 | 55.50 | 151 | 1785 | +275 |
| 145 | 1.70 | 28.57 | 8.23 | 61.49 | 109 | 1265 | +185 |
| 146 | 2.14 | 28.57 | 8.57 | 60.71 | 110 | 1500 | +157 |
| 147 | 3.43 | 28.57 | 7.89 | 60.11 | 124 | 834 | +128 |
| 148 | 6.00 | 28.57 | 7.37 | 58.06 | 129 | 1105 | +131 |
| 149 | 12.50 | 12.50 | 12.50 | 62.50 | 125 | 879 | +38 |
| 150 | 8.82 | 23.53 | 8.82 | 58.83 | 135 | 989 | +171 |
| 151 | 5.56 | 33.33 | 5.56 | 55.55 | 141 | 962 | +323 |
| 152 | 2.63 | 42.11 | 2.63 | 52.63 | 150 | 1683 | +472 |

As can be seen from the table 10, a dielectric ceramic composition expressed by a composition formula of $w \cdot Li_2O - x \cdot CaO - y \cdot Nd_2O_3 - z \cdot TiO_2$ ($w+x+y+ = 100$ mole %) has a high dielectric constant $\epsilon$, has a low temperature coefficient of resonance frequency $\tau f$ and has a high Q value.

w, x, y and z set in the following ranges:

0.0 mole % < w ≦ 25.0 mole %
0.0 mole % ≦ x < 50.0 mole %
0.0 mole % < y ≦ 20.0 mole %
0.0 mole % < z ≦ 80.0 mole %

Particularly when w, x, y and z are set in the following ranges, good dielectric properties are obtained;

0.0 mole % < w ≦ 20.0 mole %
0.0 mole % ≦ x < 50.0 mole %
0.0 mole % < y ≦ 20.0 mole %
50.0 mole % ≦ z ≦ 80.0 mole %

Description is now made of a ninth embodiment. A ceramic composition according to the ninth embodiment is obtained by mixing the ceramic composition $(Li_{\frac{1}{2}} \cdot B^{3+}{}_{\frac{1}{2}})TiO_3$ obtained in the above described first embodiment and a ceramic composition $(Na_{\frac{1}{2}} \cdot C^{3+}{}_{\frac{1}{2}})TiO_3$ having dielectric constant $\epsilon$ and having a temperature coefficient of resonance frequency $\tau f$ which is large on the plus side. At this time, $Nd^{3+}$ or $Sm^{3+}$ and $Nd^{3+}$ or $Sm^{3+}$ are respectively selected as $B^{3+}$ and $C^{3+}$.

Samples are prepared in the same method as that in the first embodiment, and the dielectric constant $\epsilon$, the Q value, and the temperature coefficient of resonance frequency $\tau f$ of the samples are measured in the neighborhood of the measurement frequency of 3 GHz using the Hakki-Coleman method.

The results of the measurements are shown in Table 11 and Table 12. In the tables, a, b, c and d are as follows:

a: $(Li_{\frac{1}{2}} \cdot Nd_{\frac{1}{2}})TiO_3$   b: $(Na_{\frac{1}{2}} \cdot Nd_{\frac{1}{2}})TiO_3$
c: $(Li_{\frac{1}{2}} \cdot Sm_{\frac{1}{2}})TiO_3$   d: $(Na_{\frac{1}{2}} \cdot Sm_{\frac{1}{2}})TiO_3$

TABLE 11

| sample number | mixture ratio (mole %) | | dielectric properties | | |
|---|---|---|---|---|---|
| | | | dielectric constant $\epsilon$ | Q value | $\tau f$ (PPM/°C.) |
| | a | b | | | |
| 153 | 80 | 20 | 100 | 851 | −15 |
| 154 | 60 | 40 | 108 | 511 | 58 |
| 155 | 40 | 60 | 106 | 513 | 205 |
| 156 | 20 | 80 | 88 | 881 | 245 |
| | a | d | | | |
| 157 | 80 | 20 | 95 | 1099 | −7 |
| 158 | 60 | 40 | 99 | 914 | 32 |
| 159 | 40 | 60 | 95 | 1072 | 144 |
| 160 | 20 | 80 | 75 | 1566 | 185 |

TABLE 12

| sample number | mixture ratio (mole %) | | dielectric properties | | |
|---|---|---|---|---|---|
| | | | dielectric constant $\epsilon$ | Q value | $\tau f$ (PPM/°C.) |
| | c | b | | | |
| 161 | 80 | 20 | 76 | 1665 | −64 |
| 162 | 60 | 40 | 89 | 1297 | 12 |
| 163 | 40 | 60 | 99 | 910 | 162 |
| 164 | 20 | 80 | 90 | 1081 | 220 |
| | c | d | | | |
| 165 | 80 | 20 | 70 | 1884 | −69 |
| 166 | 60 | 40 | 79 | 2023 | 17 |
| 167 | 40 | 60 | 81 | 1314 | 116 |
| 168 | 20 | 80 | 68 | 1537 | 178 |

As can be seen from the tables 11 and 12, a ceramic composition having a high dielectric constant $\epsilon$, having a low temperature coefficient of resonance frequency $\tau f$ and having a high Q value is obtained by mixing a ceramic composition $(Na_{\frac{1}{2}} \cdot C^{3+}{}_{\frac{1}{2}})TiO_3$ ($C^{3+}$: $Nd^{3+}$, $Sm^{3+}$) having a high dielectric constant $\epsilon$ and having a temperature coefficient of resonance frequency $\tau f$ which is large on the plus side and a ceramic composition $(Li_{\frac{1}{2}} \cdot B^{3+}{}_{\frac{1}{2}})TiO_3$ ($B^{3+}$: $Nd^{3+}$, $Sm^{3+}$) having a high dielectric constant $\epsilon$ and having a temperature coefficient of resonance frequency $\tau f$ which is large on the minus side.

FIG. 1 is a characteristic diagram showing the characteristic curve of a dielectric constant $\epsilon$ and a temperature coefficient of resonance frequency $\tau f$ against the mixture ratio of $(Li_{\frac{1}{2}} \cdot Sm_{\frac{1}{2}})$ $TiO_3$ to $(Na_{\frac{1}{2}} \cdot Sm_{\frac{1}{2}})$ $TiO_3$. The mixture ratio is thus changed, to obtain ceramic compositions having various properties.

The ceramic composition according to the ninth embodiment shown in the tables 11 and 12 is obtained by mixing the ceramic composition $(Li_{\frac{1}{2}} \cdot Nd_{\frac{1}{2}})$ $TiO_3$ or $(Li_{\frac{1}{2}} \cdot Sm_{\frac{1}{2}})$ $TiO_3$ obtained in the above described first embodiment and a ceramic composition $(Na_{\frac{1}{2}} \cdot Nd_{\frac{1}{2}})$ $TiO_3$ or $(Na_{\frac{1}{2}} \cdot Sm_{\frac{1}{2}})$ $TiO_3$ having a high dielectric constant $\epsilon$ and having a temperature coefficient of resonance frequency $\tau f$ which is large on the plus side. When the same ceramic composition as that in the ninth embodiment is obtained using high-purity powders of $TiO_2$, $Li_2CO_3$, $Na_2CO_3$, $Sm_2O_3$, and $Nd_2O_3$ as raw materials, the mixture ratios of the respective raw materials are as shown in Table 13 to Table 15. The dielectric properties of samples of the ceramic composition formed in the mixture ratios are the same as those of the samples shown in the tables 11 and 12. In the tables 13 to 15, sample numbers in parentheses correspond to the samples shown in the tables 11 and 12.

TABLE 13

| sample number | composition ratio (mole %) $w.Li_2O$—$x.Na_2O$—$y.Nd_2O_3$—$z.TiO_2$ | | | |
|---|---|---|---|---|
| | w | x | y | z |
| 169(153) | 13.33 | 3.33 | 16.67 | 66.67 |
| 170(154) | 9.99 | 6.77 | 16.67 | 66.67 |
| 171(155) | 6.77 | 9.99 | 16.67 | 66.67 |
| 172(156) | 3.33 | 13.33 | 16.67 | 66.67 |

TABLE 14

| sample number | composition ratio (mole %) $v.Nd_2O_3$—$w.Li_2O$—$x.Na_2O$—$y.Sm_2O_3$—$z.TiO_2$ | | | | |
|---|---|---|---|---|---|
| | v | w | x | y | z |
| 173(157) | 13.34 | 13.33 | 3.33 | 3.33 | 66.67 |
| 174(158) | 9.99 | 9.99 | 6.67 | 6.68 | 66.67 |
| 175(159) | 6.68 | 6.67 | 9.99 | 9.99 | 66.67 |
| 176(160) | 3.34 | 3.33 | 13.33 | 13.33 | 66.67 |
| 177(161) | 3.33 | 13.33 | 3.33 | 13.34 | 66.67 |
| 178(162) | 6.68 | 9.99 | 6.67 | 9.99 | 66.67 |
| 179(163) | 9.99 | 6.67 | 9.99 | 6.68 | 66.67 |
| 180(164) | 13.33 | 3.33 | 13.33 | 3.34 | 66.67 |

TABLE 15

| sample number | composition ratio (mole %) $w.Li_2O$—$x.Na_2O$—$y.Sm_2O_3$—$z.TiO_2$ | | | |
|---|---|---|---|---|
| | w | x | y | z |
| 181(165) | 13.33 | 3.33 | 16.67 | 66.67 |
| 182(166) | 9.99 | 6.67 | 16.67 | 66.67 |
| 183(167) | 6.67 | 9.99 | 16.67 | 66.67 |
| 184(168) | 3.33 | 13.33 | 16.67 | 66.67 |

Description is now made of a tenth embodiment using $CaTiO_3$ as a ceramic composition having a high dielectric constant $\epsilon$ and having a temperature coefficient of resonance frequency $\tau f$ which is large on the plus side.

Table 16 shows the results of measurements made of the dielectric properties of samples of a dielectric composition obtained by selecting, in a composition formula of $(Li_{\frac{1}{2}} \cdot B^{3+}_{\frac{1}{2}})$ $TiO_3$—$CaTiO_3$, $Nd^{3+}$ or $Sm^{3+}$ as $B^{3+}$ in the same manner as that in the first embodiment in the neighborhood of the measurement frequency of 3 GHz using the Hakki-Coleman method.

In the table 16, a and c are the same as those in the tables 11 and 12.

TABLE 16

| sample number | mixture ratio (mole %) | dielectric properties | | |
|---|---|---|---|---|
| | $CaTiO_3$ | dielectric constant $\epsilon$ | Q value | $\tau f$ (PPM/°C.) |
| a | | | | |
| 185 | 80 | 20 | 125 | 879 | 38 |
| 186 | 60 | 40 | 135 | 989 | 171 |
| 187 | 40 | 60 | 141 | 962 | 323 |
| 188 | 20 | 80 | 150 | 1683 | 472 |
| c | | | | |
| 189 | 80 | 20 | 103 | 1277 | 6 |
| 191 | 60 | 40 | 123 | 1156 | 154 |
| 192 | 40 | 60 | 133 | 1025 | 305 |
| 193 | 20 | 80 | 144 | 1822 | 457 |

As can be seen from the table 16, a dielectric ceramic composition having a dielectric constant $\epsilon$ which takes a large value exceeding 100, having a low temperature coefficient of resonance frequency $\tau f$ and having a high Q value is obtained.

Figure 2:
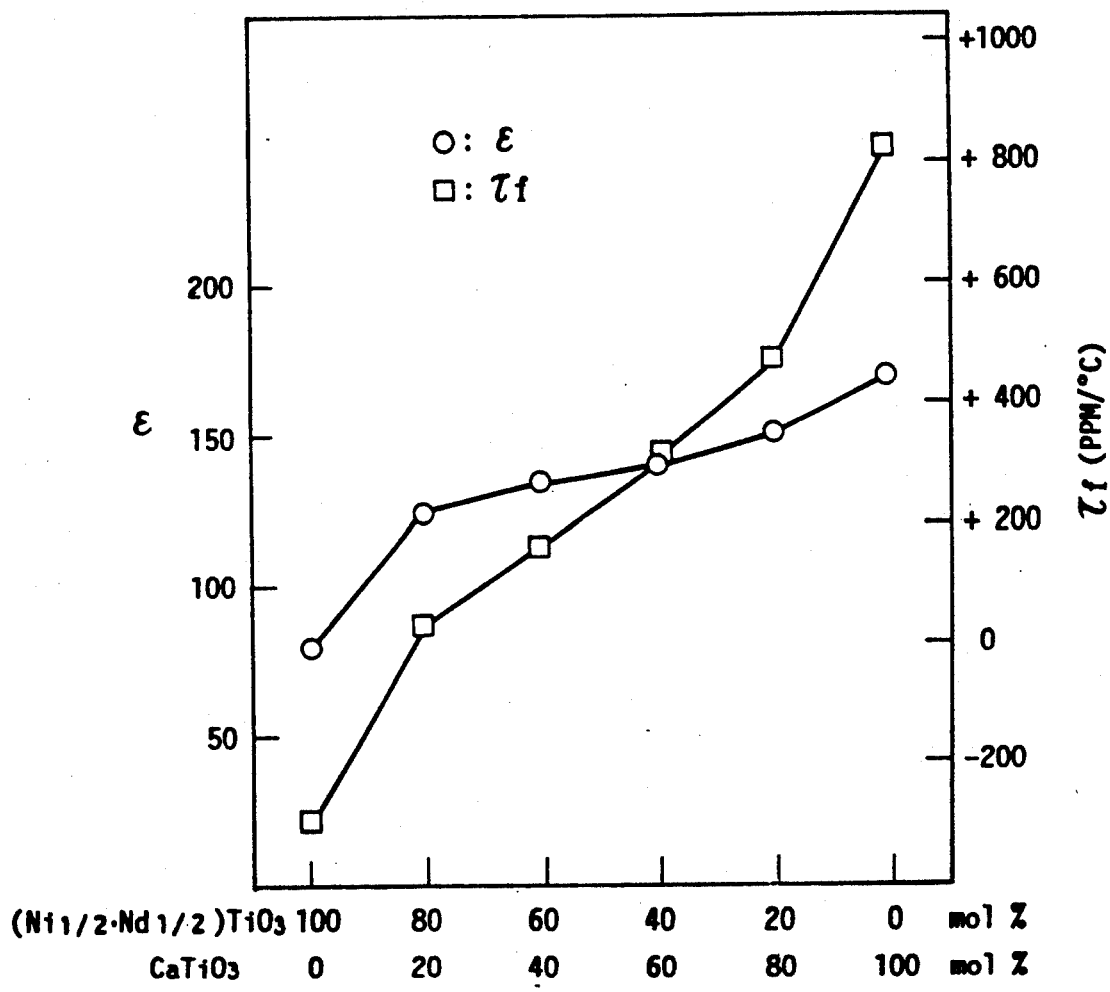
FIG. 2 is a characteristic diagram showing a characteristic curve of a dielectric constant $\epsilon$ and a temperature coefficient of resonance frequency $\tau f$ against the mixture ratio of $(Li_{\frac{1}{2}} \cdot Nd_{\frac{1}{2}}) TiO_3$ to $CaTiO_3$ according present invention.
Figure 3:
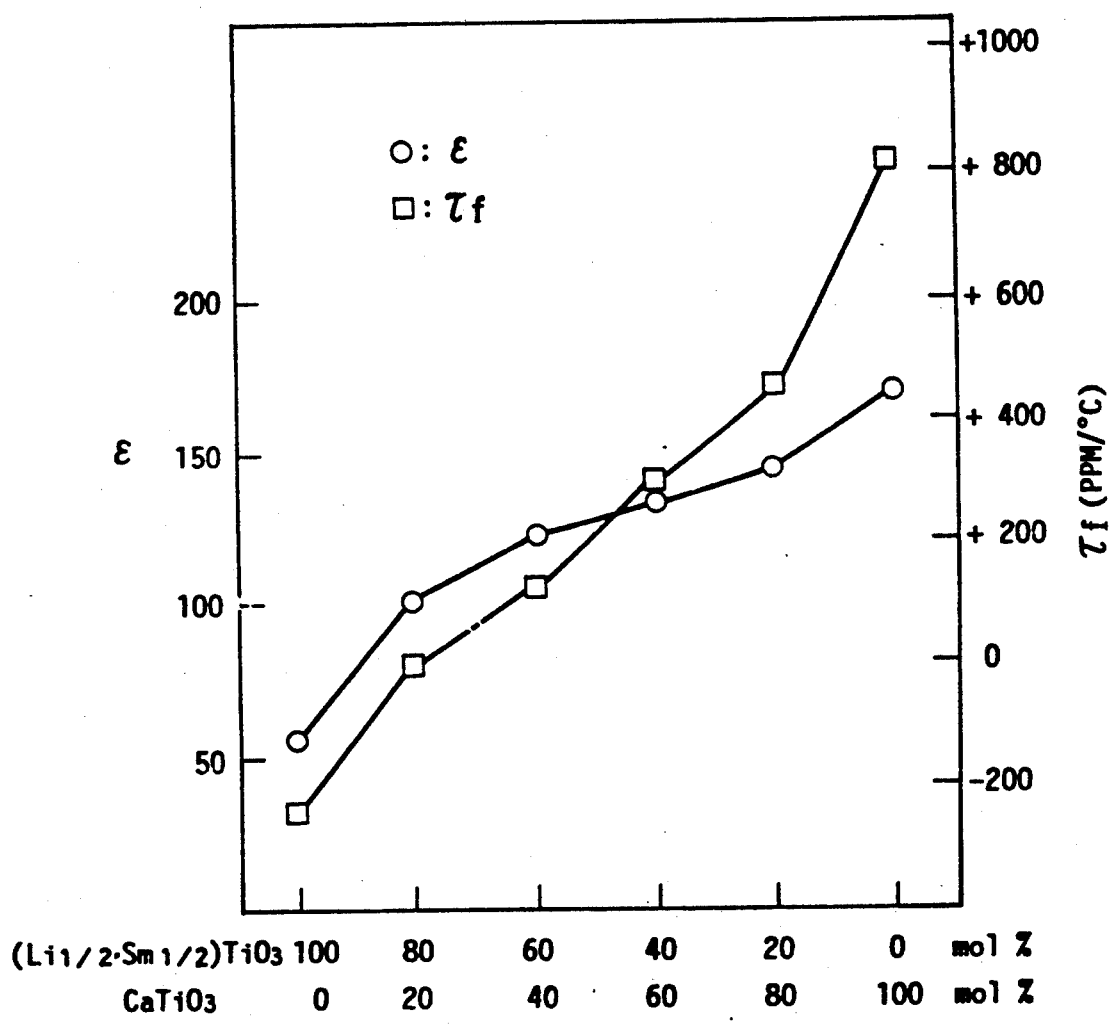
FIG. 3 is a characteristic diagram showing a characteristic curve of a dielectric constant $\epsilon$ and a temperature coefficient of resonance frequency $\tau f$ against the mixture ratio of $(Li_{\frac{1}{2}} \cdot Sm_{\frac{1}{2}}) TiO_3$ to $CaTiO_3$ according to the present invention.

A characteristic curve of a dielectric constant $\epsilon$ and a temperature coefficient of resonance frequency $\tau f$ against the mixture ratio of $(Li_{\frac{1}{2}} \cdot B^{3+}_{\frac{1}{2}})$ $TiO_3$ to $CaTiO_3$ is shown in FIG. 2 ($B^{3+}=Nd^{3+}$) and FIG. 3 ($B^{3+}=Sm^{3+}$).

Description is now made of the tenth embodiment using $CaTiO_3$ as a ceramic composition having a high dielectric constant $\epsilon$ and having a temperature coefficient of resonance frequency $\tau f$ which is large on the plus side.

The ceramic composition according to the tenth embodiment shown in the table 16 is obtained by mixing the ceramic composition $(Li_{\frac{1}{2}} \cdot Nd_{\frac{1}{2}})$ $TiO_3$ or $(Li_{\frac{1}{2}} \cdot Sm_{\frac{1}{2}})$ $TiO_3$ obtained in the above described first embodiment and $CaTiO_3$. When the same ceramic composition as that in the tenth embodiment is obtained using high-purity powders of $TiO_2$, $Li_2CO_3$, $Sm_2O_3$, $Nd_2O_3$, and $CaCO_3$ as raw materials, the mixture ratios of the ceramic composition are as shown in Table 17 and Table 18. The dielectric properties of samples of a ceramic composition formed in the mixture ratios are the same as those of the samples shown in the table 16. In the tables 17 and 18, sample numbers in parentheses correspond to the samples shown in the table 16.

TABLE 17

| sample number | composition ratio (mole %) $w.Li_2O$—$x.CaO$—$y.Nd_2O_3$—$z.TiO_2$ | | | |
|---|---|---|---|---|
| | w | x | y | z |
| 194(185) | 12.50 | 12.50 | 12.50 | 62.50 |
| 195(186) | 8.82 | 23.53 | 8.82 | 58.83 |
| 196(187) | 5.56 | 33.33 | 5.56 | 55.55 |
| 197(188) | 2.63 | 42.11 | 2.63 | 52.63 |

TABLE 18

| sample number | composition ratio (mole %) $w.Li_2O$—$x.CaO$—$y.Sm_2O_3$—$z.TiO_2$ | | | |
|---|---|---|---|---|
| | w | x | y | z |
| 199(189) | 12.50 | 12.50 | 12.50 | 62.50 |
| 199(190) | 8.82 | 23.53 | 8.82 | 58.83 |
| 200(191) | 5.56 | 33.33 | 5.56 | 55.55 |
| 201(192) | 2.63 | 42.11 | 2.63 | 52.63 |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microwave dielectric ceramic composition comprising a composition according to the formula $(A^{1+}{}_{\frac{1}{2}} \cdot B^{3+}{}_{\frac{1}{2}})TiO_3$, wherein $A^{1+}$ is $Li^{1+}$, and $B^{3+}$ is a member of the group consisting of $Nd^+$, $Sm^{3+}$, $Co^{3+}$ and $Pr^{3+}$.

2. A microwave dielectric ceramic composition consisting essentially of: 100 parts by weight of a ceramic $(Li_{\frac{1}{2}} \cdot Nd_{\frac{1}{2}})TiO_3$; and 10 parts by weight of a member from the group consisting of MgO, CoO, and ZnO.

3. A microwave dielectric ceramic composition consisting essentially of: 100 parts by weight of a ceramic $(Li_{\frac{1}{2}} \cdot Pr_{\frac{1}{2}})TiO_3$; and 10 parts by weight of a member from the group consisting of MgO, CoO, and ZnO.

4. A microwave dielectric ceramic composition consisting essentially of: 100 parts by weight of a ceramic $(Li_{\frac{1}{2}} \cdot Sm_{\frac{1}{2}})TiO_3$; and 10 parts by weight of a member from the group consisting of $CaCO_3$, $SrCO_3$, and ZnO.

5. A microwave dielectric ceramic composition comprising a composition according to the formula $w \cdot A^{1+}{}_2O - x \cdot A^{1+'}{}_2O - y \cdot B^{3+}{}_2O_3 - z \cdot TiO_2$, wherein $w+x+y+z=100\%$ mole, $A^{1+}$ is $Li^{1+}$, $A^{1+'}$ is $Na^{1+}$, and $B^{3+}$ is a member of the group consisting of $Nd^{3+}$ or $Sm^{3+}$.

6. The microwave dielectric ceramic composition according to claim 2, wherein $B^{3+}$ is $Nd^{3+}$, and w, x, y and z are in the following ranges:

| |
|---|
| $0.0$ mole $< w \leq 17.0$ mole %, |
| $0.0$ mole $\leq x \leq 17.0$ mole %, |
| $0.0$ mole $< y \leq 25.0$ mole %, |
| $0.0$ mole $< z \leq 80.0$ mole %. |

7. The microwave dielectric ceramic composition according to claim 2, wherein $B^{3+}$ is $Sm^+$, and w, x, y and z are in the following ranges:

| |
|---|
| $0.0$ mole $< w \leq 17.0$ mole %, |
| $0.0$ mole $\leq x \leq 17.0$ mole %, |
| $0.0$ mole $< y \leq 20.0$ mole %, |
| $0.0$ mole $< z \leq 75.0$ mole %. |

8. A microwave dielectric ceramic composition comprising a composition according to the formula $v \cdot B^{3+'}{}_2O_3 - w \cdot A^{1+}{}_2O - x \cdot A^{1+'}{}_2O - y \cdot B^{3+}{}_2O_3 - z \cdot TiO_2$, wherein $A^{1+}$ is $Li^{1+}$, $A^{1+'}$ is $Na^{1+}$, $B^{3+}$ is $Sm^{3+}$, and $B^{3+'}$ is a member of the group consisting of $Nd^{3+}$ and $Pr^{3+}$.

9. The microwave dielectric ceramic composition according to claim 5, wherein $B^{3+'}$ is $Nd^+$ and v, w, x, y and z are in the following ranges:

| |
|---|
| $0.0$ mole $< v \leq 25.0$ mole %, |
| $0.0$ mole $< w \leq 17.0$ mole %, |
| $0.0$ mole $\leq x \leq 17.0$ mole %, |
| $0.0$ mole $< y \leq 25.0$ mole %, |
| $0.0$ mole $< z \leq 80.0$ mole %. |

10. The microwave dielectric ceramic composition according to claim 5, wherein $B^{3+'}$ is $Pr^{3+}$, and v, w, x y and z are in the following ranges:

| |
|---|
| $0.0$ mole $< v \leq 7.0$ mole %, |
| $0.0$ mole $< w \leq 15.0$ mole %, |
| $0.0$ mole $\leq x \leq 7.0$ mole %, |
| $0.0$ mole $< y \leq 16.0$ mole %, |
| $0.0$ mole $< z \leq 75.0$ mole %. |

11. A microwave dielectric ceramic composition comprising a composition according to the formula $w \cdot A^{1+}{}_2O - x \cdot CaO - y \cdot B^{3+}O_3 - z \cdot TiO_2$, wherein $w+x+y+z=100\%$ mole, $A^{1+}$ is $Li^{1+}$, and $B^{3+}$ is a member of the group consisting of $Sm^{3+}$ an $Nd^{3+}$.

12. The microwave dielectric ceramic composition according to claim 8, wherein $B^{3+}$ is $Sm^{3+}$, and w, x, y and z are in the following ranges:

13. The microwave dielectric ceramic composition according to claim 8, wherein $B^{3+}$ is $Nd^{3+}$, and w, x, y and z are in the following ranges:

| |
|---|
| $0.0$ mole $< w \leq 25.0$ mole %, |
| $0.0$ mole $\leq x < 50.0$ mole %, |
| $0.0$ mole $< y \leq 20.0$ mole %, |
| $0.0$ mole $< z \leq 80.0$ mole %. |

| |
|---|
| $0.0$ mole $< w \leq 25.0$ mole %, |
| $0.0$ mole $\leq x < 50.0$ mole %, |
| $0.0$ mole $< y \leq 20.0$ mole %, |
| $0.0$ mole $< z \leq 80.0$ mole %. |

14. A microwave dielectric ceramic composition comprising a composition according to the formula $x \cdot (Li_{\frac{1}{2}} \cdot B^{3+}{}_{\frac{1}{2}}) TiO_3 - (100-x)(Na_{\frac{1}{2}} \cdot C^{3+}{}_{\frac{1}{2}}) TiO_3$, wherein $0$ mole $\% < x < 100$ mole %, and $B^+$ and $C^{3+}$ are, respectively, a member of the group consisting of $Nd^{3+}$ and $Sm^{3+}$.

15. A microwave dielectric ceramic composition comprising a composition according to the formula $x \cdot (Li_{\frac{1}{2}} \cdot B^{3+}{}_{\frac{1}{2}}) TiO_3 - (100-x)(CaTiO_3$, wherein $0$ mole $\% < x < 100$ mole %, and $B^{3+}$ is a member of the group consisting of $Nd^{3+}$ and $Sm^{3+}$.

* * * * *

UNITED STATES PATENT AND TRADEMARK OFFICE
CERTIFICATE OF CORRECTION

PATENT NO. : 5,188,993
DATED : February 23, 1993
INVENTOR(S) : Hisakazu Takashi et al Page 1 of 2

It is certified that error appears in the above-indentified patent and that said Letters Patent is hereby corrected as shown below:

Column 8, TABLE 6, change "w.Li$_2$O-x.Na$_2$O-y.Nd$_2$O$_3$-z.TiO$_2$" to --w.Li$_2$O-x.Na$_2$O-y.Sm$_2$O$_3$-z.TiO$_2$--.

Column 9, TABLE 6, change "w.Li$_2$O-x.Na$_2$O-y.Nd$_2$O$_3$-z.TiO$_2$" to --w.Li$_2$O-x.Na$_2$O-y.Sm$_2$O$_3$-z.TiO$_2$--.

Column 11, TABLE 8, change "v.Pr$_2$P$_3$-w.Li$_2$O-x.Na$_2$O-y.Sm$_2$O$_3$-z.TiO$_2$" to --v.Pr$_2$O$_3$-w.Li$_2$O-x.Na$_2$O-y.Sm$_2$O$_3$-z.TiO$_2$--.

Column 17, line 2,, change "according to claim 2," to --according to claim 5,--.

Column 17, line 2, change "according to claim 2," to --according to claim 5,--.

Column 18, line 2, change "according to claim 5," to --according to claim 8,--.

Column 18 line 2, change "according to claim 5," to --according to claim 8.--.

Column 18, line 2, change "according to claim 8," to --according to claim 11,--.

UNITED STATES PATENT AND TRADEMARK OFFICE
CERTIFICATE OF CORRECTION

PATENT NO. : 5,188,993

DATED : February 23, 1993

INVENTOR(S) : Hisakazu Takashi et al

It is certified that error appears in the above-indentified patent and that said Letters Patent is hereby corrected as shown below:

Column 18, line 2, change "according to claim 8, "to --according to claim 11, --.

Signed and Sealed this

Fourteenth Day of June, 1994

Attest:

BRUCE LEHMAN

*Attesting Officer*  *Commissioner of Patents and Trademarks*